(12) United States Patent
Vaninger et al.

(10) Patent No.: US 8,985,178 B1
(45) Date of Patent: Mar. 24, 2015

(54) TIRE BEAD BREAKER DEVICE AND METHODS FOR AUTOMATED TIRE CHANGER MACHINE

(75) Inventors: Micah N. Vaninger, St. Louis, MO (US); Douglas S. Hanneken, St. Louis, MO (US); Charlie Polster, Edwardsville, IL (US); Joel Clasquin, Highland, IL (US); Steven K. Molbach, Ballwin, MO (US)

(73) Assignee: Hunter Engineering Company, St. Louis, MO (US)

( * ) Notice: Subject to any disclaimer, the term of this patent is extended or adjusted under 35 U.S.C. 154(b) by 758 days.

(21) Appl. No.: 13/090,588

(22) Filed: Apr. 20, 2011

Related U.S. Application Data

(60) Provisional application No. 61/327,361, filed on Apr. 23, 2010.

(51) Int. Cl.
*B60C 25/00* (2006.01)

(52) U.S. Cl.
USPC ............................ 157/1.26; 157/1.1; 157/1.17

(58) Field of Classification Search
USPC .......................................... 157/1.1, 1.7, 1.26
See application file for complete search history.

(56) References Cited

U.S. PATENT DOCUMENTS

| | | | |
|---|---|---|---|
| 5,226,465 A | 7/1993 | Schon et al. | |
| 6,527,032 B2 | 3/2003 | Corghi | |
| 7,264,032 B2 * | 9/2007 | Peinelt et al. | 157/1.22 |
| 7,455,097 B2 | 11/2008 | Bonacini | |
| 7,882,882 B2 * | 2/2011 | Cunningham | 157/1.24 |
| 2006/0169414 A1 * | 8/2006 | Hillman et al. | 157/1 |
| 2009/0266493 A1 | 10/2009 | Gonzaga et al. | |
| 2009/0266494 A1 * | 10/2009 | Sotgiu | 157/1.24 |

FOREIGN PATENT DOCUMENTS

| | | | | |
|---|---|---|---|---|
| DE | 2529343 A1 | 1/1977 | | |
| EP | 1366933 B1 * | 5/2003 | ............ | B60C 25/138 |
| EP | 1366933 B1 | 8/2007 | | |
| EP | 1724129 B1 | 3/2008 | | |

* cited by examiner

*Primary Examiner* — Lee D Wilson
*Assistant Examiner* — Shantese McDonald
(74) *Attorney, Agent, or Firm* — Armstrong Teasdale LLP

(57) ABSTRACT

Automated tire changer machines, control systems and methods therefor utilize positive contact and contact force generation between wheel rims and bead breaker devices to break tire bead seals. The bead breaker devices may accordingly follow different geometries of wheel rims without prior knowledge or identification of the specific rim configuration by the machine.

36 Claims, 11 Drawing Sheets

TIRE BEAD BREAKER DEVICE AND METHODS FOR AUTOMATED TIRE CHANGER MACHINE

CROSS REFERENCE TO RELATED APPLICATIONS

This application claims the benefit of U.S. Provisional Application No. 61/327,361 filed Apr. 23, 2010 which is hereby incorporated by reference in its entirety.

BACKGROUND OF THE INVENTION

The field of the invention relates generally to tire changer machines, and more specifically to tire changer machines having improved bead breaking capabilities for automatically changing tires on a wheel rim.

The process of removing a tire from a wheel rim and replacing it with another tire, referred to herein as tire changing, can be difficult. In response to such difficulties, machines have been developed to facilitate the tire changing process. The machines commonly include a clamping mechanism and a drive assembly that rotates the wheel rim about an axis. A bead breaker tool exerts pressure on the tire adjacent the wheel rim to break the tire bead seal, and a tire removal tool, which may be either manually inserted by a machine operator or integrated into the machine itself, is used to pull the bead of the tire off the wheel rim as the wheel rim is rotated, allowing the tire to be separated from the rim for removal. Manual or machine implemented tools are also utilized to press the tire onto the wheel rim for installation. While known machines have obtained some level of success in reducing the time and labor associated with changing a tire, there remains room for improvement.

BRIEF DESCRIPTION OF THE INVENTION

Exemplary embodiments of tire changer machines, control systems and methods therefore are described hereinbelow utilizing physical contact between a bead breaker device and a wheel rim to break a tire bead seal with the rim. A predetermined amount of contact force may also be generated and maintained throughout some or all of a tire bead breaking procedure in a completely automated manner. Position and force sensor elements may monitor wheel rim and bead breaker device contact, and also contact force generation therebetween, and communicate with a controller that operates actuators coupled to the bead breaking device. Contact force may therefore be limited so as not to damage the wheel rim or machine.

Establishing or maintaining contact force between the bead breaker device and wheel rim allows the bead breaker device to follow the contour and geometry of the wheel rim well, without the particulars of the geometry being known by the machine or otherwise identified in order to complete a bead breaking procedure. Differently configured rims with different geometries and contours can be followed automatically by the bead breaker device in a highly reliable, yet comparatively low cost manner relative to existing high performance tire changer machines. High aspect ratio tires, and tire and rim combinations that are difficult to change with existing machines, may be capably handled by the inventive machine and methods.

Also, when using conventional tire changer machines, a machine operator typically must apply a lubricant to the tire bead and the wheel to assist in the bead breaking process, but the inventive machines and methods described herein eliminate any such need for the operator to lubricate the tire bead.

The exemplary embodiments of tire changer machines, control systems and methods therefore provide more effective tire bead breaking in a reduced amount of time and with less effort by operators than conventionally equipped tire changer machines. Error conditions can likewise be detected so that corrective actions can be taken in a failed tire bead breaking procedure.

BRIEF DESCRIPTION OF THE DRAWINGS

Non-limiting and non-exhaustive embodiments are described with reference to the following Figures, wherein like reference numerals refer to like parts throughout the various views unless otherwise specified.

FIG. 6 illustrates partial sectional views of the wheel rim and bead breaker roller showing a path of movement of the bead breaker roller, wherein:

DETAILED DESCRIPTION OF THE INVENTION

Figure 1A:
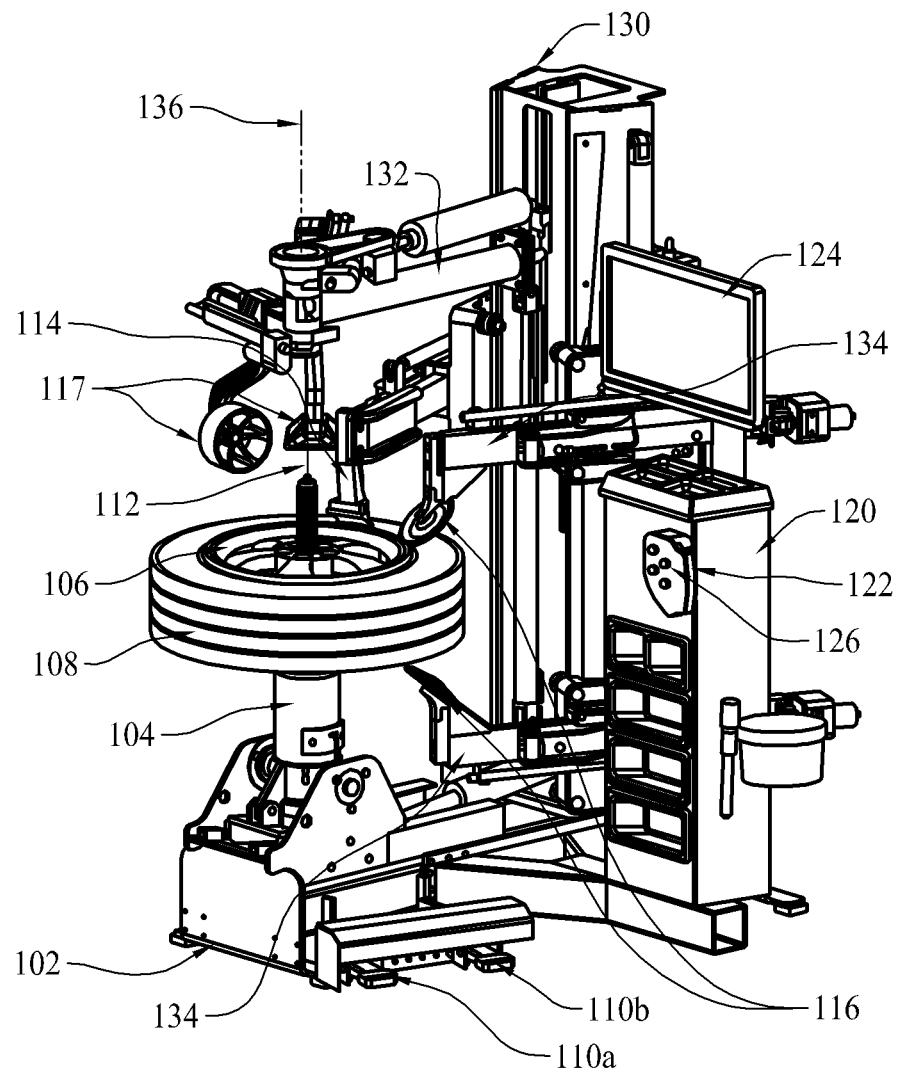
FIGS. 1a, 1b and 1c are respective views of an exemplary embodiment of a tire changing machine in a perspective view, a magnified view, and a sectional view.

In recent times a great variety of sizes in wheel rims and tires are being utilized as both original equipment and after market accessories for vehicles. Accommodating the wide variety of wheel rims and tire sizes with existing tire changing machines is difficult. Conventionally, machines have been designed predominately for so-called "standard" tire and rim sizes, and also for "standard" tire types. When used with the types of wheel rims and tire types for which the machines were designed, they may work quite well. However, it is common nowadays for many vehicle repair shops or retail tire dealers to routinely encounter tires and rims that deviate, sometimes greatly, from the standard sizes and tire types for which conventional machines have been designed. Additionally, run flat tires and the like having a much stiffer construction are now available and in common use on many types of vehicles. The combination of a larger wheel and rim sizes, and also a stiffer tire construction, can be particularly problematic in many existing machines.

Also in recent times, rotationally mounted, conical-shaped bead breaker roller devices, sometimes referred to as bead breaker roller tools, have replaced side mounted shovel tools to become the accepted standard on high performance tire changers for loosening tire bead seals. Advantages of such bead breaker roller tools over side mounted shovel tools include improved operator control, a reduced chance of wheel and tire damage, improved operator ergonomics, and an ability to use the bead breaker roller tools to rotationally match the tire to the wheel. Additionally, bead breaker roller tools can aid tool positioning during tire mounting and de-mounting operations. An upper bead roller tool can act as a guide for the tire bead during mounting operations, and the lower bead roller tool can be used to de-mount the lower tire bead.

On the other hand, bead breaker rollers are generally not as fast-acting as a side shovel bead breaker, and bead breaker roller tools may not be as effective when de-mounting tires with high aspect ratios due to the flexible nature of the tire sidewall. Bead breaker roller tools of existing machines are conventionally designed to follow a fixed path during the bead breaking operation. In such machines, the bead breaker roller device is typically positioned at a starting point which is typically on the tire sidewall right at the outer diameter of the rim, but typically not touching the rim, and then the bead breaker roller is driven under the bead lip of the wheel rim, towards the tire bead and toward the wheel rim center to break the tire bead seal. To prevent damage to the wheel rim and the bead breaker roller device, the fixed path is conventionally designed to prevent any contact between the wheel rim and the bead breaker roller device itself.

Such fixed path tire bead breaking may be initiated by operator input or possibly by a switch or sensor on the tire changer. However, in known machines of this type, exactly the same predetermined path of movement is followed by the bead breaker tools for all wheel rims. While the predetermined path may have been designed to accommodate most wheel rims contemplated at the time, due to an increasing variation in wheel rims encountered nowadays, it is not possible to optimize the bead breaking operation using a single fixed path of movement for the bread beaker roller devices. The predetermined, fixed path for bead breaker tool movement in such machines may work well on some types of wheel rims and tires, not so well for other types, and fail to work altogether on still other types.

U.S. Patent Application Publication No. 2009/0266494 A1 describes a tire changer machine and method utilizing machine vision technology to direct a bead breaking tool to follow a determined path in a tire change operation that may desirably vary to accommodate different types of wheel rims. As described, the bead breaking tool is only able to move in a direction parallel to the axis of the wheel, which is a vertical axis in the described embodiment. Horizontal motion occurs by moving the clamped wheel and clamping spindle horizontally in a direction perpendicular to the wheel's axis. Dirt and debris around the tire changing process is an impediment to such a system involving a camera, however, and it is difficult to position the camera so that it can see the inner rim surface adequately. Such machines, while being quite sophisticated, provide limited effectiveness in actual use, can be relatively expensive and difficult to implement, and are subject to reliability issues and difficult maintenance issues over time.

Exemplary embodiments of tire changing machines and methods are described in detail below, that avoid the aforementioned problems and difficulties and which facilitate efficient tire changing with reduced difficulty for machine operators. Improved control features provide specific adaptability for a great variety of wheel rims of different types, and facilitate more effective tire bead breaking procedures in a highly reliable and comparatively low cost manner compared to existing machines.

Much effort has been made in connection with recent tire changing machines to avoid placement of any of the machine tools in a way in which they contact or touch the wheel rim. This reflects a widely held belief in the art that physical contact with the wheel rim should always be avoided in a tire change procedure to ensure that wheel rims, some of which can be customized and costly, will not be damaged as the tire changer machines are used. U.S. Patent Application Publication No. 2009/0266494, in accordance with and representative of such a belief, repeatedly teaches and emphasizes that it is important to maintain a small spacing between a bead breaker roller device and the wheel rim so as to avoid physical contact between the wheel rim flange and the machine bead breaker roller, and also to avoid physical contact between the bead breaker tool and the wheel rim well as the tire bead seal is broken. Indeed, this is the purpose of the machine vision technology for the machine and method described. The machine must "see" the contour and geometry of the wheel rim so that the spindle can be moved relative to the bead breaker tool to maintain the desired spacing of the bead breaker tool from the wheel rim. Applicants believe that such concerns are perhaps misplaced, and have become an impediment to effective use of the machines to break tire bead seals, at least with respect to certain types of tires and wheel rims.

In order to more effectively accommodate a wide variety of different tires and rims with a single tire changer machine, it is desirable to allow a bead breaking roller to follow the wheel rim profile more closely to optimize its path for individual wheel rims, as opposed to a predetermined fixed path that is not dependent on individual rim features, and improve bead breaking performance. One way to accomplish this, while avoiding the difficulties of the machine and method described in U.S. Patent Application Publication No. 2009/0266494 A1, would be to place a bead breaker tool in physical contact with the wheel rim, and let the bead breaker tool blindly follow the contour of the wheel rim, without having to "see" or otherwise react to the geometry of the wheel rim using machine vision technology or other features. In such a blind system, machine vision technology is not necessary to accomplish tire bead breaking, and neither is precise adjustment of position of the wheel rim relative to the bead breaker tool, or vice versa, as the geometry of the wheel rim changes to maintain a spacing between the wheel rim and the bead breaker tool.

The Applicants have found, contrary to the well established belief in the art to avoid physical contact between the machine tools and the wheel rim, that physical contact between a bead breaker tool and a wheel rim can be of much benefit when performing a tire bead breaking procedure. Specifically, by bringing the bead breaker roller tool into physical contact with the wheel rim, tire beads have been found to be effectively broken loose from even the most difficult wheels without damaging the wheel rim. The Applicants have further found that generating some degree of actual contact force between a bread breaker tool and the wheel rim can be beneficial to effectively break tire bead seals without damaging wheel rims. Such application of contact force makes it possible to break tire bead seals quite quickly compared to other known techniques utilized by existing machines that avoid any contact between the machine tools and wheel rims. Even for high aspect ratio tires, tires that are stuck on the wheel rim due to high mileage, tires that fit very snugly onto the wheel bead seat, and stiff tires—all factors which tend to increase the difficulty of tire bead breaking and can cause difficulties for known tire changer machines—may be rather easily overcome with the inventive tire changing machine and methods utilizing actual physical contact and contact force between bead breaker tools and wheel rims.

Exemplary embodiments of tire changing machines and methods are described in detail below illustrating the inventive physical and contact force concepts for tire bead breaking with a tire changer machine. The machines and methods described below facilitate efficient tire changing with reduced difficulty for machine operators, and with improved control features. More effective tire bead breaking procedures are therefore provided utilizing actual physical contact and contact force between the bead breaker tools and wheel rims, with increased bead breaking reliability at comparatively lower cost than some known machines.

Figure 1B:
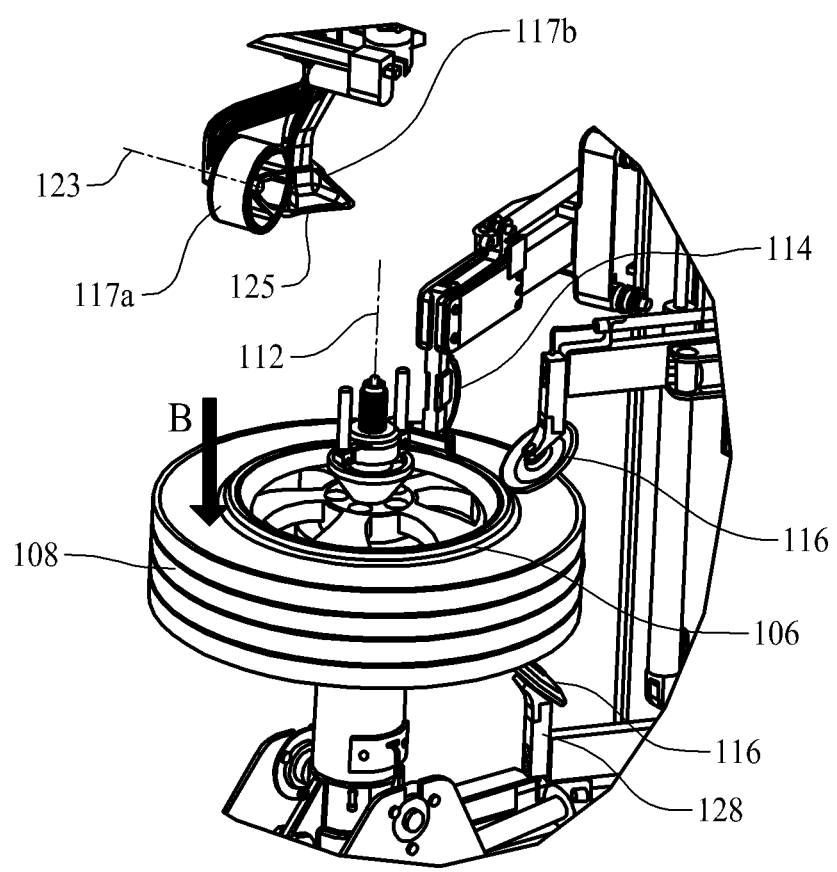
Figure 1C:
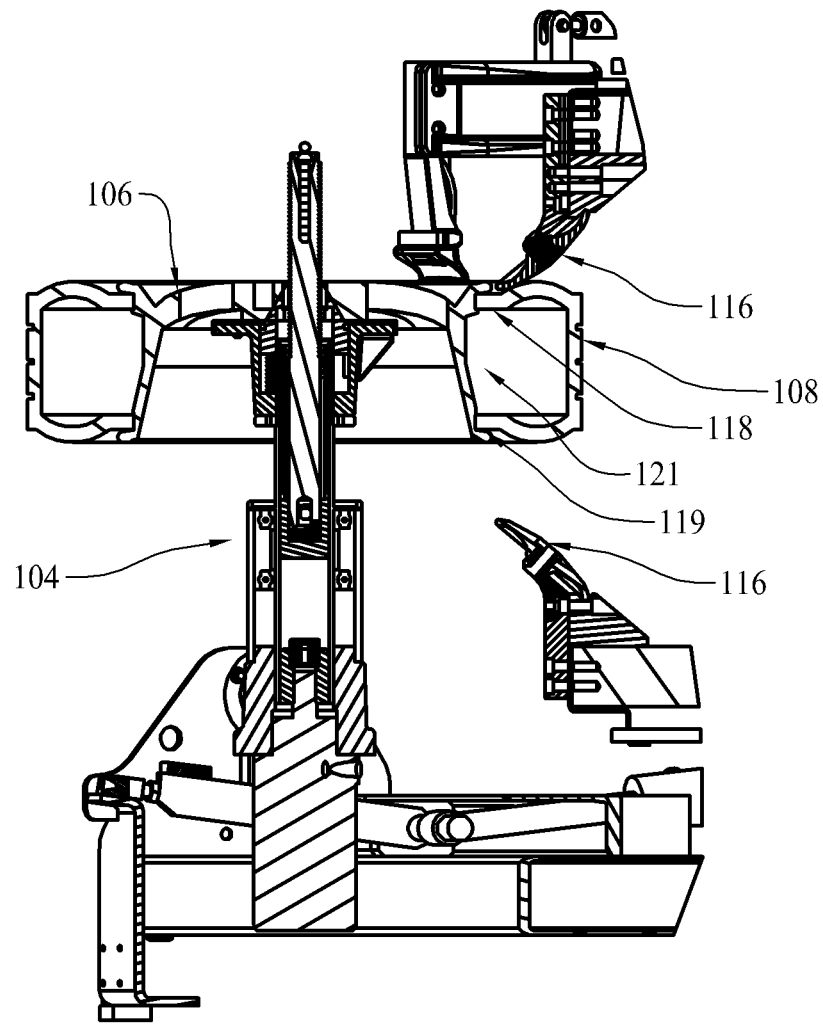

FIGS. 1a, 1b and 1c illustrate an exemplary tire changing machine 100 including a frame or base 102 and a rotatable drive shaft assembly 104 attached to the base 102. The drive shaft assembly 104 may include a post or shaft positioned centrally on the base 102, and the shaft is adapted to receive and retain a wheel rim 106 having a tire 108. The wheel rim 106 may be secured to the drive shaft assembly 104 with a clamping mechanism after the wheel rim 106 and tire 108 is loaded and mounted onto the machine 100. In an exemplary embodiment, the clamping mechanism may be as described in the commonly owned U.S. patent application Ser. No. 12/358,760 filed Jan. 23, 2009, the disclosure of which is hereby incorporated by reference in its entirety. In other embodiments, alternative clamping mechanisms known in the art may be utilized.

After the wheel rim 106 is clamped in position, a machine operator manipulates an input selector 110a which operates the drive shaft assembly 104 to rotate the wheel rim 106 and tire 108 about a drive axis 112 (FIG. 1b). In different exemplary embodiments, the drive shaft assembly 104 may be pneumatically or hydraulically actuated or powered electrically. In another embodiment, a rotating turntable or other mechanism may be provided in lieu of the drive shaft assembly 104.

While the drive axis 112 is illustrated as being generally vertical in the embodiment depicted, the axis 112 may be oriented horizontally or otherwise in other embodiments, and the axis 112 may be selectively positionable in different positions relative to the base 102.

As the wheel rim 106 is rotated about the axis 112, one or more tire changing tools 114, 116 and 117 may be brought into physical contact or engagement with the tire 108 in the direction of arrow B (FIG. 1b) at respective locations proximate an outer periphery of the rim 106. With the tools 114, 116 and 117 in the proper position with respect to the tire 108 and wheel rim 106, the tire 108 and wheel rim 106 are rotated about the axis 112 with the tools 114, 116 and 117 engaged to the tire 108 to install or remove the tire. Also, an automated force may optionally be applied to the tool 117 in order to create a fraction point between the wheel rim 106 and the tire 108 by pushing the tool 117 (and hence the tire 108 also) in the direction of rotation of the rim 106. Such creation of a fraction point is described in U.S. application Ser. No. 12/877,430 and will not be further described herein.

The tool 114 is sometimes referred to as tire mount or demount tool. The tool 114 may include a wedge that is extended into an area between the wheel rim 106 and the tire 108 to separate or displace an inner circumference of the tire 108 including the bead 118 (FIG. 1 c) over the outer lip 119 (FIG. 1 c) of the wheel rim 106 to remove the tire 108, or to engage the inner circumference of the tire 108 including the bead 118 on the outer lip 119 of the wheel rim 106 to install the tire 108. The tire 108 may be appropriately lubricated to facilitate easier removal and installation using the tool 114.

The tools 116 are sometimes referred to as bead breaker tools that exert pressure on the tire 108 to either break the tire bead seal 118 with the rim 106 or push or displace the inner circumference of the tire 108 over the outer lip of the wheel rim 106 to install the tire 108, or alternatively to break the tire bead seal as described further below. As shown in the exemplary embodiment in FIGS. 1a and 1b, two bead breaker tools 116 are shown, one located above the tire 108 and the other located below the tire 108. In another embodiment, a single bead breaker tool 116 could be provided.

The tools 117 are sometimes referred to as pressing tools, pusher tools, or bead pressing devices. As shown in the exemplary embodiment in FIGS. 1a and 1b, bead pressing devices 117 are shown that exert pressure on the tire sidewall in tire mounting and de-mounting procedures. In the exemplary embodiment shown differently configured bead pressing devices 117a and 117b are shown.

The bead pressing device 117a, is a roller device that is mounted for rotation about an axis 123 that is substantially perpendicular to the machine drive axis 112. Thus, when the roller device 117a is placed in contact with the tire sidewall, it may rotate about the axis 123 as the tire is rotated about the machine drive axis 112 while the device 117a remains in a fixed position relative to the machine drive axis 112. When desired, the roller device 117a is also operable wherein it may rotate in tandem with the tire 108 about the drive axis 112.

The bead pressing device 117b is adapted for stationary contact with the tire 108 and includes a frictional engagement surface 125. When engaged to the tire sidewall, the pressing device 117b rotates about the drive axis 112 with the tire 108. Optionally the pressing device 117b may incorporate a feature that engages a spoke, a hole, or other feature of the wheel rim 106 to ensure that pressing device 117b (and also the tire 108 with which it is engaged) rotates along with the wheel rim 106 and that the pressing device 117b does not move relative to the wheel rim 106. Alternatively, the pressing device 117b may optionally be coupled with an independent drive mechanism that pushes the bead pressing device 117b and the tire 108 in the direction of rim rotation about the drive axis 112. This is sometimes referred to as establishing a "fraction point" in addition to pushing the tire bead 118 (FIG. 1 c) into a drop center 121 of the wheel rim 106 when mounting the tire 108.

The pressing tools 117a, 117b may be spaced from one another to maintain the tire bead 118 in the drop center 121 (FIG. 1 c) of the wheel rim 106 during tire de-mounting procedures, or to push the tire bead 118 into the drop center 121 in a tire mounting procedure. While two bead pressing devices 117a and 117b are shown in FIGS. 1a and 1b, additional bead pressing devices 117 may be provided. Two or more bead pressing devices 117 are beneficial for mounting or de-mounting larger diameter tires and stiffer tires, although it is understood that in some cases a single bead pressing device 117 may be sufficient to mount or de-mount certain types of tires.

The tools 114, 116, and the bead pressing devices 117 serve to supply sufficient tire insertion or removal forces at the correct angle and location with respect to the tire 108 such that the bead 118 of the tire 108 is forced out of or onto a bead seat on the wheel rim 106. While exemplary tire changing tools 114, 116, and bead pressing devices 117 are illustrated, still other tire changing tools and devices may be provided and used for bead breaking, tire mounting and/or demounting, locating a valve stem, locating a wheel weight, locating a wheel sensor such as a Tire Pressure Pressure Monitoring System (TPMS) sensor, or other purposes. Such other tools may be provided in addition to or in lieu of the tools 114, 116 and bead pressing devices 117 as depicted.

Like many known machines, the effectiveness of the tire changing machine 100 is largely dependent on the ability of its operator to prepare the wheel rim 106 and correctly position the tire changing tools 114, 116 and the bead pressing devices 117 to install or remove the tire 108 from the wheel rim 106. The bead breaker tool 116 and the mount and demount tool 114 exert respective pressure on the tire 108 to seat or unseat the tire bead 118 from the rim 106 when installing or removing the tire 108, and the bead pressing devices 117 maintain the tire 108 in a desired position relative to the rim 106 as the tools 114 and 116 operate.

More specifically, when the bead rollers 116 are used to exert pressure on the tire 108 to break the tire bead seal 118, the rollers 116 are first brought into contact with the tire 108 as near to the lip of the rim 106 as possible. Down force is applied to the upper roller 116 in a direction (indicated by arrow B in FIG. 1b) that is parallel to the wheel axis 112 to push the tire bead 118 off of the rim 106. As the wheel rim 106 and tire 108 are rotated about the axis 112 the tool 114 applies appropriately directed force to the tire 108 to either direct the tire 108 off of the wheel rim 106 (de-mounting) or onto the wheel rim 108 (mounting). The bead pressing devices 117 further provide down force and pressure to maintain portions of the tire 108 in the drop center 121 (FIG. 1 c) of the rim 106 and guide the tire 108 onto the rim 106 during tire mounting as the tire 108 is rotated. Also, downward force and pressure exerted by the bead pressing device 117 facilitates tire de-mounting by applying pressure to the tire 108 to ensure that it stays in the rim drop center 121. The tire 108 is kept in the drop center 121 during de-mounting because the bead 118 cannot stretch over the rim lip 119 (FIG. 1 c). The drop center 121 allows the tire bead to 118 be positioned eccentric to the rim lip 119 and bead seat. This provides clearance between the tire 108 and the rim lip 119 to allow the tire 108 to be lifted over the rim lip 119 and be removed from the wheel rim 106.

In an effort to address difficulties in properly locating the tire changing tools 114 and 116 and undesirable consequences of improper tool placement, some machines are known having a sensory capability to detect a position of tools such as the tools 114 and 116 with respect to the tire 108 and/or wheel rim 106. For example, one known tire changing machine includes a switch mechanism that changes state when the bead breaker tool moves just beyond the outer edge of the rim, ensuring that the bead breaker is positioned to engage a tire at a predetermined location. Machine vision systems are also known that help align bead breaker tools with respect to the wheel rim at predetermined locations.

The exemplary machine 100 as shown also includes a tower 130 extending from the base 102 at a location spaced from the drive assembly 104, and the tower extends to a height well above the tire 108 and rim 106 when mounted to the machine. A linkage 132 extends outwardly from the tower 130, and the pressing tools 117 are coupled to the linkage 132. The linkage 132 is movable by an actuator in the tower 130 in a direction parallel to arrow B in FIG. 1b, such that as the linkage 132 is moved, the bead pressing devices carried on the linkage 132 are moved toward or away from the tire 108. As such, the bead pressing devices 117 may be moved in a direction parallel to the machine drive axis 112.

Also, the bead pressing devices 117 are mounted to the linkage 132 such that they are rotatable about an axis 136 that is fixed and coincident with the machine drive axis 112 in a tire change procedure. That is, the pressing devices 117 are rotatable about the axis 136 that is coaxial with the machine drive axis 112. As such, because the axis 136 is coincident with the drive axis 112, when the bead pressing devices 117 are in contact with the tire 108, the bead pressing devices 117 may rotate with the tire 108 as it is rotated about the drive axis 112. Unlike conventional tire changing machines, including but not limited to so-called swing-arm style machines, the rotational axis 136 for the pressing devices 117 is fixed at a set distance and location from the tower 130 in an exemplary embodiment. A more compact machine arrangement and work area is therefore provided compared to some conventional machines.

While locating the rotation axis 136 of the pressing devices 117 at a fixed and set distance and location from the tower 130 can be beneficial for the reasons stated, it is recognized that in further and/or alternative embodiments neither the location of the drive axis 112 nor the rotational axis 136 for the pressing devices need necessarily be fixed in such a manner so long as the axes 112 and 136 are positionable to become coincident when the pressing devices 117 are needed. That is, either or both of the axes 112 and 136 may be movable to different operating positions, distances and orientations relative to each other and relative to the tower 130 for reasons not pertinent to use of the pressing devices 117, but when the pressing devices 117 are to be engaged to the tire, the axes 112 and 136 are moved to become coincident once again so that the bead pressing devices 117 may rotate with the tire 108 about the drive axis 112.

The bead pressing devices 117 are further movable in a direction perpendicular to the axis 136 and the drive axis 112. That is, actuators are provided that move the bead pressing devices 117 toward and away from the drive axis 112, such that the bead pressing devices 117 may be manually or automatically adjusted to different radial positions measured from the drive axis 112 to accommodate tires and rims of different diameters. The bead pressing devices 117 may also be manually or automatically positioned in the direction perpendicular to the drive axis 112 as described below.

The bead breaker tools 116 are also coupled to and supported by the tower 130 (or other support structure in an alternative embodiment) via linkages 134 that also movable in vertical and horizontal directions as described below to position the bead breaker tools 116 relative to the wheel rim 106 and tire 108 for use. The positions of the tools 114 and 116, the bead pressing devices 117, and operation of the drive assembly 104 and other features may be coordinated by a control unit 120 that may include a controller (discussed below) and actuator components operatively connected to the controller.

A machine operator may manipulate input selectors 110a and 110b for example, which communicate with the control unit 120 to move the tools 114, 116 to desired positions and/or to operate the drive assembly 104 or activate other machine features. In illustrative embodiments, the input selectors 110a and 110b may be foot pedals located near the bottom of the machine base 102 for convenient use of the machine operator (s). In other embodiments, other known input selectors, including but not limited to levers, buttons, knobs, switches, joysticks, and touch sensitive screens may be employed in various locations on or near the machine 100. An operator station 122 including a display 124 and an input device 126 including a keyboard or other input selectors may be optionally provided for the benefit of the operator. Still other features of the machine may be provided, such as tire inflation systems and the like familiar to those in the art.

Figure 2:
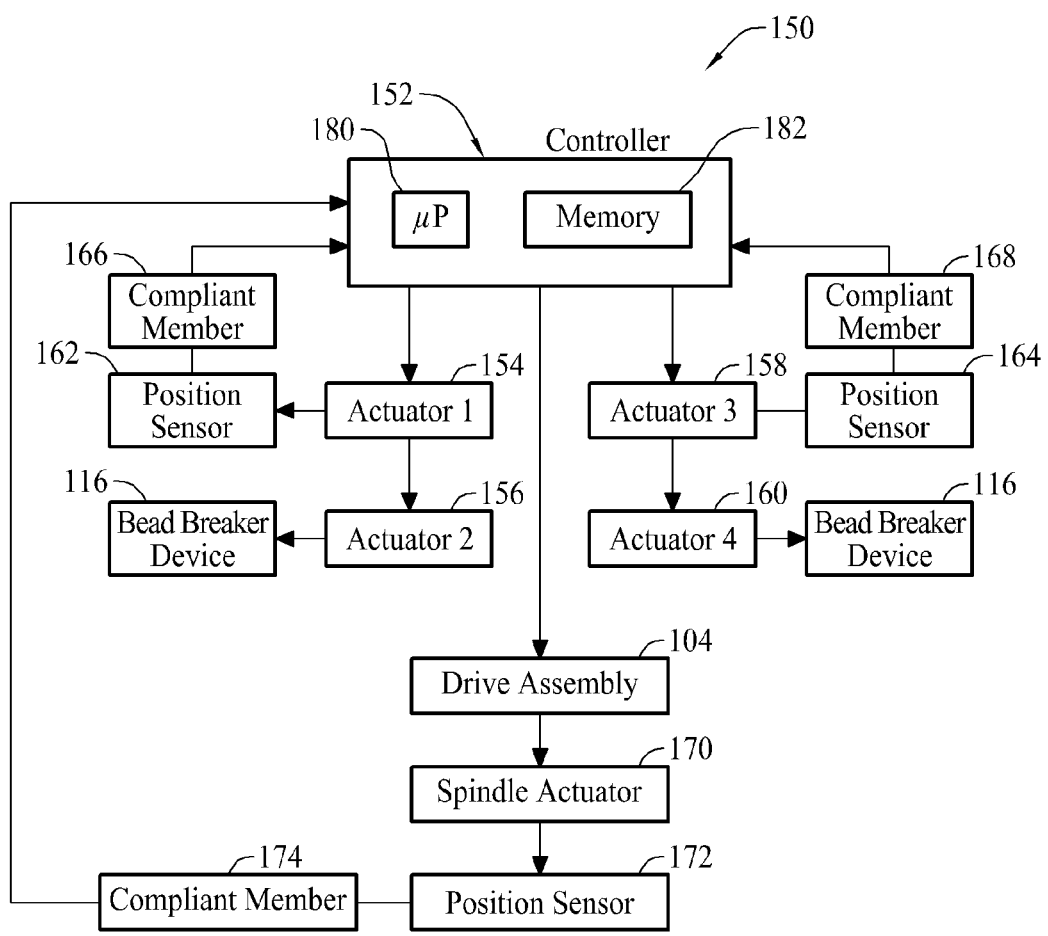
FIG. 2 schematically illustrates an exemplary control system for the machine shown in FIGS. 1a, 1b and 1c.

FIG. 2 schematically illustrates an exemplary control system 150 that may be used with the machine 100 for more optimal use and control of the machine 100 to change tires.

As shown in the embodiment of FIG. 2, the control system 150 generally includes a controller 152 operatively coupled to actuators 154, 156, 158, 160 each associated with one of the bead breaker tools 116. In the example shown, the actuators 154 and 156 may be coupled to the upper bread breaker tool 116 (FIG. 1) and the actuator 158, 160 may be coupled to the lower bead breaker tool 116 (FIG. 1). Further, the actuators 154 and 158 may be horizontal actuators that move the respective upper and lower bead breaker tools along an axis generally perpendicular to the machine drive axis 112 (FIG. 1), while the actuators 156 and 160 may be vertical actuators in the embodiment shown and move the respective upper and lower bead breaker tools along an axis generally parallel to the machine drive axis 112 (FIG. 1). Alternatively stated, the actuators 154 and 158 may move the respective bead breaker tools 116 radially toward and away from the machine drive axis 112 (FIG. 1) to place the bead breaker tools 116 in appropriate radial locations on the tire 108 relative to the machine drive axis 112, and the actuators 156 and 160 may move the respective bead breaker tools 116 along the drive axis 112 to apply appropriately directed pressure to mount or de-mount a tire 108 from a wheel rim 106.

In the illustrated embodiment, the actuators 154 and 158 each include feedback control elements in the form of position sensors 162, 164 that in combination with compliant members 166, 168 are used to generate a predetermined amount of contact force between the bead breaker tools 116 and the wheel rim 106 to de-mount the tire 108 as described below. Locking mechanism and actuators therefore may also be provided to selectively enable or disable the functionality of the respective compliant members 166 and 168 as explained below.

Optionally, and as also shown in FIG. 2, the controller 152 is coupled to the drive assembly 104, which may further include a spindle actuator 170 that moves the drive axis 112 (FIG. 1) laterally relative to the machine base 102. Thus, for example, in such an embodiment the drive axis 112 (and also the tire 108 and wheel rim 106 coupled to the drive axis 112 with the clamping mechanism) may be moved by the actuator 170 in a direction generally perpendicular to the drive machine axis 112, such as a direction extending toward or away from the tower 130 shown in FIG. 1a. A machine equipped with such an actuator 170 may therefore move the drive axis 112 toward the bead breaking tools 116, in addition to or in lieu of the actuators 154 and 158 moving the bead breaker tools 116 toward the drive axis 112. The spindle actuator 170 may likewise be equipped with a position sensor 172 and a compliant member 174 to apply and maintain a predetermined amount of contact force between one of the bread breaker tools 116 and the wheel rim 106 in use.

If desired, the clamping mechanism that couples the wheel rim 106 and tire 108 to the drive assembly 104 may be movable by still another actuator in a direction parallel to the drive axis such that the wheel rim 106 and tire 108, when clamped to the drive assembly 104, are movable in directions parallel and perpendicular to the drive axis 112. As such, a stationary bead breaker device 116 could accomplish bead breaking while the wheel rim 106 is moved relative to the bead breaker device 116.

In another possible embodiment, the presence of the actuator 170 may render one or more of the actuators 154, 156, 158 and 160 unnecessary in certain embodiments. That is, when the wheel rim 106 is movable in a direction perpendicular to the drive axis 112, actuators 154 and 158 that move the bead breaker devices 116 in the same direction can be omitted. Still further, when the wheel rim 106 is movable in a direction parallel to the drive axis, the actuators 156 and 160 that move the bead breaker devices 116 in the same direction can be omitted. Likewise, the presence of the actuators 154, 156, 158 and 160 may render the spindle actuator 170 unnecessary in other embodiments.

In various embodiments, the controller 152 may be, for example, a microcomputer, a programmable logic controller, or other processor-based device. Accordingly, the controller 152 may include a microprocessor 180 and a memory 182 for storing instructions, control algorithms and other information as required to function in the manner explained below. The controller memory 182 may be, for example, a random access memory (RAM), or other forms of memory used in conjunction with RAM memory, including but not limited to flash memory (FLASH), programmable read only memory (PROM), and electronically erasable programmable read only memory (EEPROM). Alternatively, non-processor based electronics and circuitry may be provided in the controller 152 with equal effect to serve similar objectives. For example, a supercapacitor may be provided to give the controller time to store procedure sensitive data such as the current state in a software based state machine in the event of power loss. Other elements such as line filters and capacitors for filtering noisy power may be included. Disk storage such as a CD-ROM, DVD, or hard disk may be provided for storage of various tire profiles that may be recalled to optimize the tire mount or de-mount process. The tire profiles may include detailed data regarding dimensional aspects of tires to be changed and other information concerning the tires that may be useful and beneficial to the machine operator or the control system.

In various exemplary embodiments of the control system 150, the actuators 154, 156, 158, 160 and 170 may respectively include hydraulic cylinders, pneumatic actuators, electric motors, or still other types of actuators. The actuator types for the actuators 154, 156, 158, 160 and 170 may be of the same or different type (e.g., hydraulic, pneumatic, electric or other) in numerous variations of machines.

Likewise, in various exemplary embodiments, the position sensors utilized in the control system 150 may include positioning encoders, proximity switches or other switch devices, Hall Effect sensors, machine vision elements and other sensors and technologies known in the art. More than one type of positioning sensor or sensing technology may be utilized in numerous variations of machines with similar effects.

Figure 3:
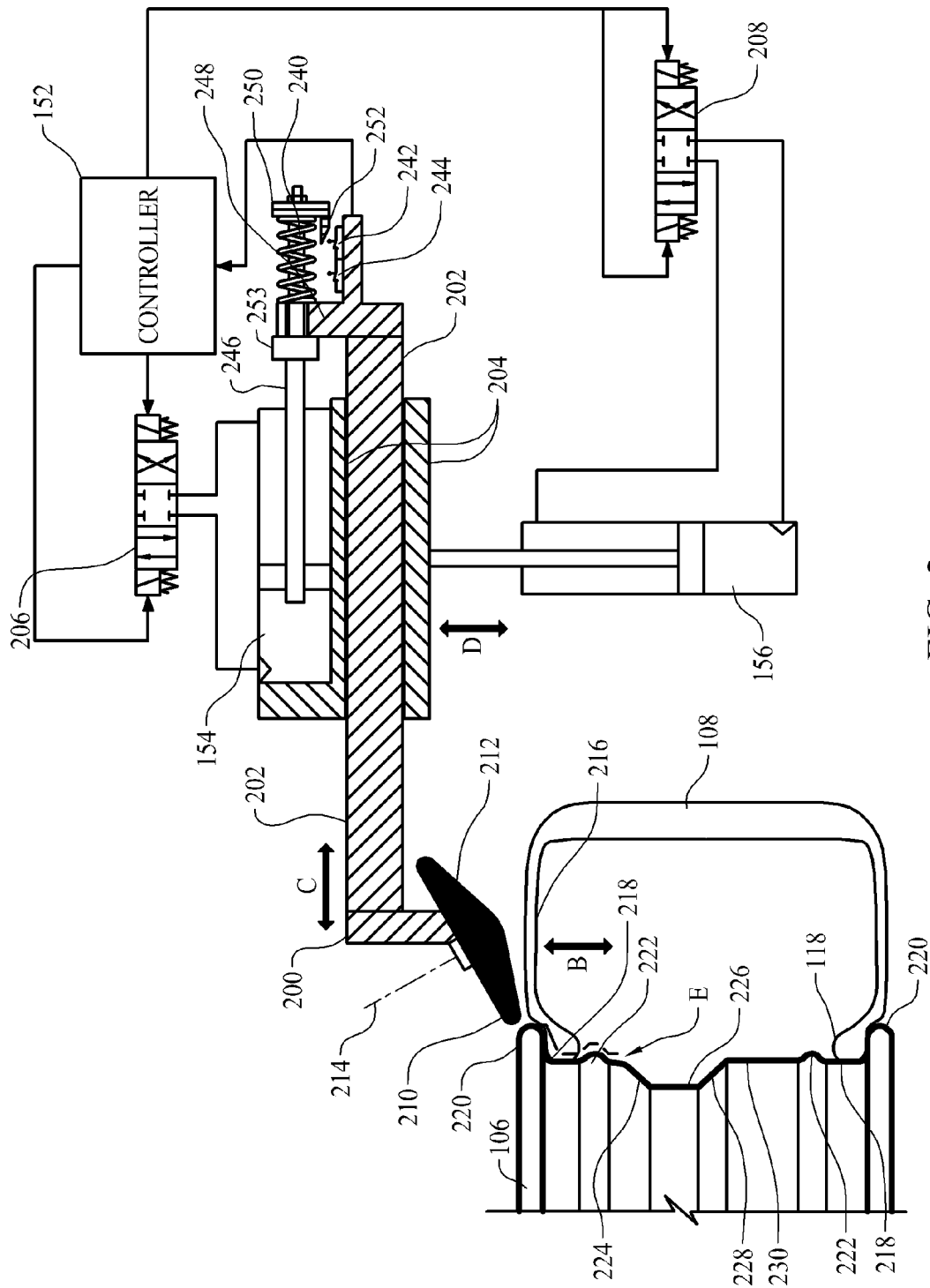
FIG. 3 is a partial sectional and schematic view of a portion of the machine shown in FIG. 1 and the control system shown in FIG. 2, and further illustrating a first tire bead breaking position of a bead breaker roller.
Figure 4:
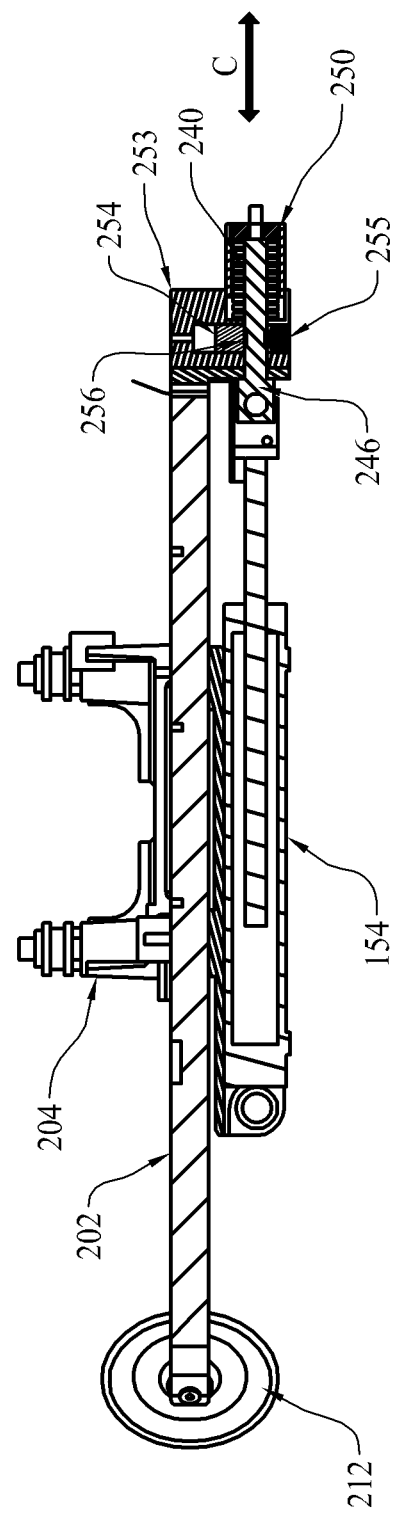
FIG. 4 is a top sectional view of the bead breaker tool assembly shown in FIG. 3.
Figure 5:
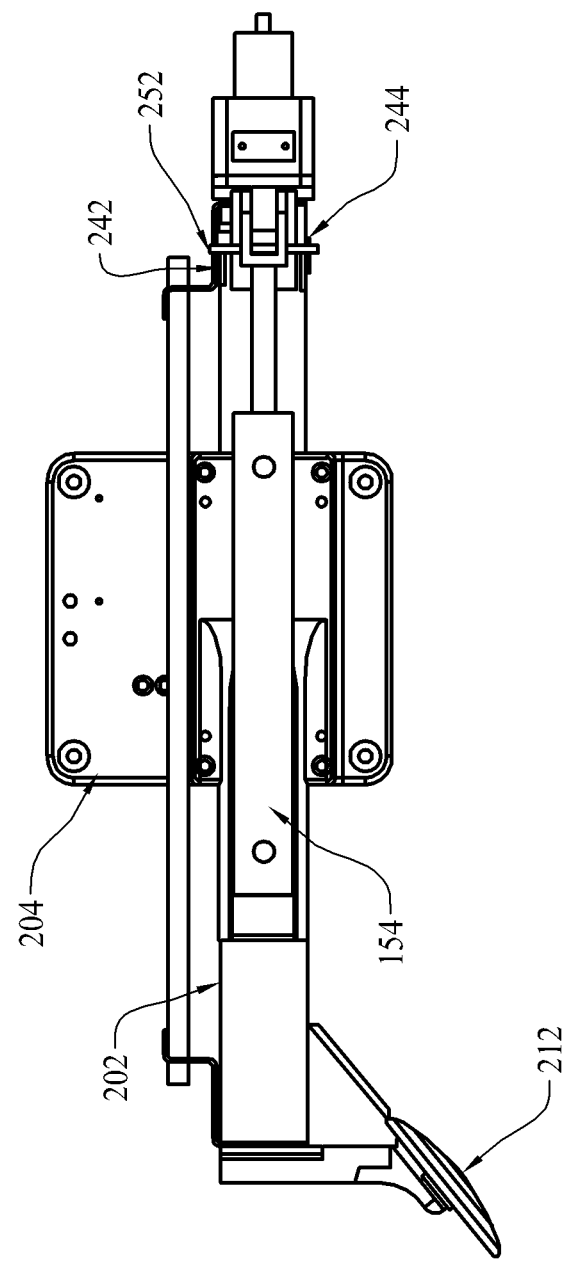
FIG. 5 is a side elevational view of the bead breaker tool assembly shown in FIG. 4.

FIG. 3 is a partial sectional and schematic view of a portion of the machine 100 (FIG. 1) and the control system 150 (FIG. 2), and further illustrating a first tire bead breaking position of one of the bead breaker roller tools 116. FIGS. 4 and 5 illustrate in sectional view and assembly view, respectively, exemplary tool assemblies for the bead breaker rollers.

In the depicted view of FIG. 3, the upper bead breaker 116 is shown, and is rotationally mounted to an end 200 of a tool slide 202. The tool slide 202 is slidably movable within a central bore of a carriage 204, and is driven by the actuator 154 along a first axis indicated by the arrow C (a horizontal axis as shown in FIG. 3) to selectively extend or retract the bead breaker roller 116 toward or away from the wheel rim 106 in a direction perpendicular to the machine drive axis 112 (FIG. 1a). To effect this movement of the tool slide 202 with the actuator 154, the controller 152 communicates with a first directional control valve 206 that, in turn, causes the actuator 154 to drive the tool slide 202 to and from the carriage 204 along the first axis.

The controller 152 in the illustrated embodiment further communicates with a second directional control valve 208 that effectuates movement of the second actuator 156. The actuator 156 is, in turn, coupled to the tool carriage 204 and drives the carriage 204 (and the tool slide 202) along a second axis indicated by the arrow D (a vertical axis as shown in FIG. 3) to selectively position the bead breaker roller 116 in a direction parallel to the machine drive axis 112 (FIG. 1a).

The bead breaker roller tool 116 as shown includes a ring shaped outer periphery or edge 210 and a conical shaped surface 212 extending opposite the tool slide end 200. The bead breaker roller tool 116 is mounted to the tool end 200 for rotation about a fixed axis 214 that extends obliquely to each of the axes C and D upon which movement of the tool slide 202 may be directed to adjust a position of the bead breaker roller tool 116 relative the wheel rim 106 and tire 108. In a tire bead breaking procedure, the outer periphery 210 of the bead breaker roller tool 116 is engaged in physical surface contact with the wheel rim 106 and the conical shaped surface 212 engages a sidewall 216 of the tire 108. When so engaged, the bead breaker roller tool 116 may apply downwardly directed pressure on the tire sidewall 216 to dislodge the tire bead 118 from a bead seat 218 of the wheel rim 106 as explained below. When the machine drive assembly 104 (FIG. 1a) is activated to rotate the wheel rim 106 and tire 108 about the drive axis 112, the bead breaker roller tool 116 may rotate about its axis 214 so that the conical shaped surface 212 is rotated at the same speed as the wheel rim 106 and tire 108 to avoid the bead breaker tool 116 from sliding over the tire sidewall 216. Frictional forces in such an embodiment are desirably avoided.

While a rotating bead breaker device such as the tool 116 is beneficial, it is not required. The bead breaking functionality described further below may alternatively be accomplished with a non-rotating bead breaker device that may be moved along a similar path as described below for the roller 116. Additional geometry could potentially be built into a non-rotational bead breaking device to provide still other benefits.

As shown in FIG. 3, the wheel rim 106 includes a non-linear surface profile in a plane extending perpendicular to the machine drive axis 112 (FIG. 1a). That is, the geometry, and particularly the outer radius of the wheel rim is not constant along an axis parallel to the machine drive axis 112, which coincides with a center axis of the wheel rim 106. In the example shown, the upper side of the rim 106 includes a projecting flange or lip 220 having a first radius that is larger than a radius of the bead seat 218 located just below the lip 220. A safety hump 222 projects from the wheel rim a bit below the bead seat 218, and the hump has a variable radius defining a curvilinear surface with a radius larger than the bead seat 218 but smaller than the wheel rim lip 220. A transition section 224 is situated beneath the safety hump 222, and in the example shown includes first and second generally linear and inclined or sloped portions each with a gradual, but different, reduction in radius that ends with a radius that is smaller than the radius of the bead seat 118. A constant radius drop center 226 follows the transition section 224 of the wheel rim 106.

Continuing with the example shown in FIG. 3, the wheel rim 106 on its lower side further includes another transition section 228 opposite the transition section 224. As can be seen, the transition sections 228 and 224 are not the same. The transition section 228 includes one generally linear portion wherein the radius increases from the constant radius of the drop center 226 to a larger radius. A relatively large constant radius section 230 extends adjacent to the transition section 228, and another safety hump 222, bead seat 218 and a flange or lip 220 completes the lower profile of the wheel rim 106.

While an exemplary profile of the wheel rim 106 has been shown and described, it is understood that the profiles can and do vary considerably among wheel rims 106 that are frequently encountered by users of the machine 100. As previously discussed, and because of the differently configured rims now in widespread use, there is no single, predetermined path for the bead breaker tool 116 that will successfully change tires 108 on a wide variety of differently configured wheel rims 106 having different profiles, especially non-linear profiles of the type presently illustrated.

Figure 6A:
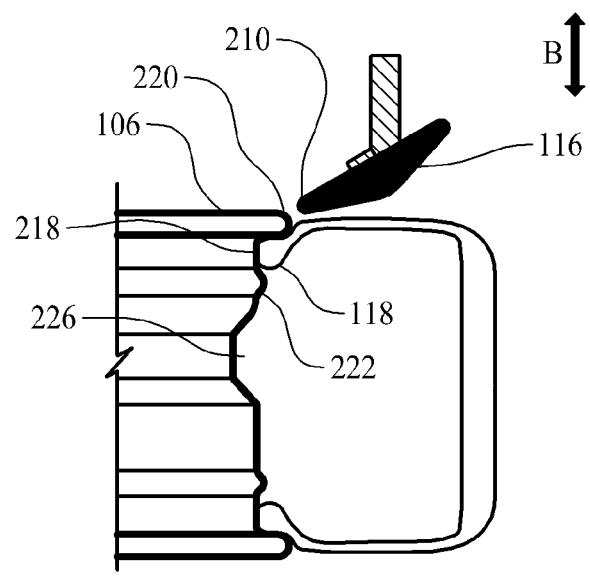
FIG. 6a shows an initial position of the bead breaker roller.
Figure 6B:
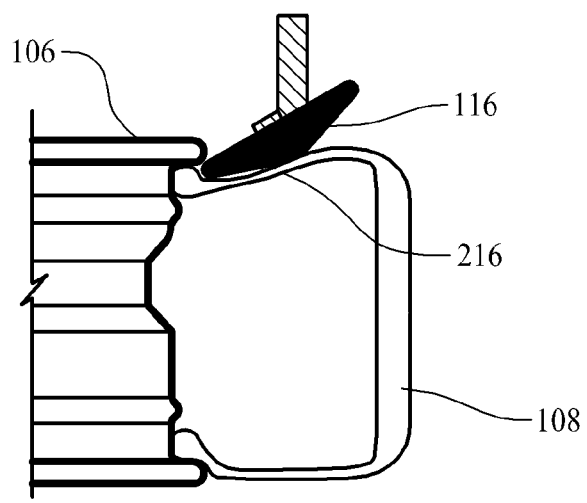
FIG. 6b shows the bead breaker roller moving around the wheel rim lip toward the wheel rim bead seat.

As shown in FIG. 3, the bead breaker roller 116 in an exemplary embodiment is moved along a non-linear path of movement represented by arrow E and also partially illustrated in FIGS. 6a to 6d to effectively break the tire bead seal. The bead breaker roller 116 is initially placed onto the tire sidewall surface 216 adjacent to the rim lip 220 as shown in FIGS. 3 and 6a. From this initial position, a first portion of the path E involves moving the bead breaker roller 116 vertically downward in the direction of Arrow B so that the bead breaker roller 116 clears the rim lip 220 as shown in FIG. 6b. This first portion of the path E may be of a fixed distance in one embodiment, with the downward movement being pre-selected so that the bead breaker roller 116 clears the wheel rim lip. In another embodiment, however, the first portion of the path E need not be fixed or predetermined.

Figure 6C:
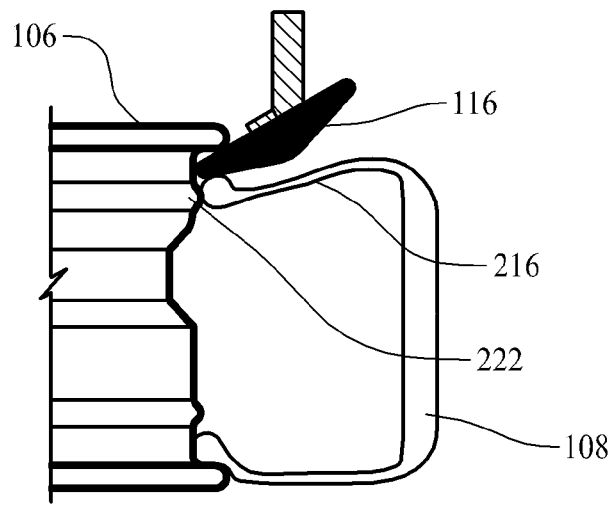
FIG. 6c shows the bead breaker encountering a safety hump of the wheel rim.
Figure 6D:
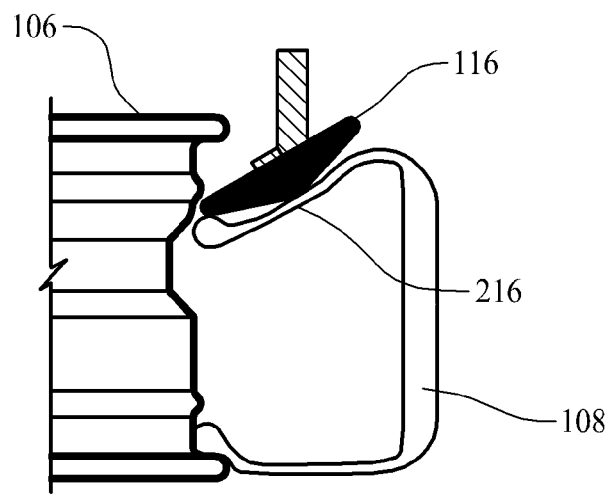
FIG. 6d shows the bead breaker device after navigating over the safety hump.

A second portion of the path E involves moving the bead breaker roller 116 toward the rim 106 in the direction of arrow C. In this portion of the path E, the bead roller 116 is moved inwardly until the contact surface 210 (FIG. 3) of the roller 116 makes contact with the wheel rim 106 near the tire bead seat 218. The contact of the bead breaker roller 116 with the wheel rim 106 in this portion of the path E is sensed by the closure of a switch 242 (FIG. 3) described below. At this point the bead breaker roller 116 is moved down in the direction E while remaining in contact with the wheel rim 106 as shown in FIG. 6c. By having the contact surface 210 of the bead breaker roller 116 remain in contact with the wheel rim 106, however, variations in the wheel rim profile for any given rim 106 can become inconsequential to the effectiveness of tire bead breaking By virtue of such contact, the bead breaker tool 116 can accordingly be allowed to follow the profile of the wheel rim profile, which may be non-linear as FIGS. 3 and 6a-6d show, without the particulars of the wheel rim 106 being made known to the machine in advance. That is, the bead breaker roller tool 116 may proceed along a path, indicated by the arrow E, that matches the profile of the wheel rim 106, without the particular features of the wheel rim 106 being known or identified in advance. Machine vision technology or other wheel rim sensing features are thereof not needed by the machine 100 to effectively break tire bead seals across a variety of differently configured wheel rim and tire combinations. Likewise, the machine operator need not be concerned with the specifics of the wheel rim 106 when breaking loose a tire bead seal.

To establish and maintain a beneficial degree of surface contact between the wheel rim 106 and the bead breaker roller tool 116, an exemplary compliant member 240 and a set of switches 242 and 244 are provided as shown in FIG. 3. In combination, the compliant member 240 and switches 242, 244 provide position and force detection capability for engagement of the bead breaker roller tool 116 with the wheel rim 106.

In the example depicted, the compliant member 240 is provided in the form a coil spring element extending about a shaft 246 coupled to the actuator 154. The spring element extends between a first abutment surface 248 carried on the tool slide and a second abutment surface 250 that is separately provided and mounted stationary to the shaft 246. As such, when the actuator 154 is operated to move the shaft 246, the tool slide 202 is also moved along the axis of arrow C. When the bead breaker roller tool 116, and specifically the outer periphery 210 of the tool 116, contacts the wheel rim 106 the tool slide 202 ceases to further move the direction of the axis C. The actuator 154, however, may continue operating, and while the tool slide 202 no longer moves at this point, the shaft 246 does continue to move and the abutment surface 250 compresses the spring compliant member 240. In this state, the actuator 154 generates contact force between the periphery 210 of the bead breaker roller tool 116 and a surface of the wheel rim 106, such as the outer surface of the wheel rim lip 220 in the position shown in FIG. 3.

A switch trigger 252 is provided on the abutment surface 250 which, as the spring compliant member 240 is deflected or compressed, interacts with the switches 242 and 244 to ensure that contact is made between the bead breaker roller tool 116 and the wheel rim 106, and also that contact force is being generated, but in an amount that would not cause damage to either the bead breaker tool 116 or the wheel rim 106. As one example, the first switch 242 may be located at first distance from the abutment surface 250 and may be tripped by the trigger 252 to detect when the spring compliant member 242 is compressed by a predetermined amount, thereby generating some degree of contact force between the periphery contact surface 210 at the outer periphery of the bead breaker roller tool 116 and a surface of the wheel rim 106, such as the outer surfaces of the wheel rim 106 associated with the path E shown in FIG. 3. When the first switch 242 is tripped by the trigger 252, the controller 152 holds the position of the actuator 154 so that further contact force is not generated. Once the contact force is established, however, the compliant member 240 maintains the contact force even after the actuator 154 is deactivate, and the first switch 242 may accordingly signal the controller 152 to appropriately adjust and lower a rate of operation of the actuator 154 since the wheel rim has now been contacted.

The second switch 244 may be spaced from the first switch 242 on the tool slide 202 such that it would not be tripped until the spring compliant member 240 is compressed beyond a predetermined amount. The second switch 244 may therefore serve as a limit switch to prevent the controller 152 from applying too much contact force between the bead breaker roller 116 and a surface of the wheel rim 106, or to otherwise sense a reaction force when certain conditions are encountered, such as when the tire sidewall buckles as described below.

By monitoring the state of the switches 242 and 244, the controller 152 may detect physical contact (or lack of contact) between the bead breaker tool 116 and the wheel rim 120, as well as some indication of the contact force generated in order to make effective control decisions.

In a further embodiment the bead breaker roller tool 116 may be fabricated from a conductive polymer material, and a circuit could be closed through the conductive polymer material when contact with the wheel rim 106 is established. By monitoring such a circuit, the controller 152 could detect contact between the wheel rim 106 and the bead breaker roller tool 116 in addition to or in lieu of detection of the contact using the switch 242.

By strategically selecting the position of the switches 242 and 244 and the stiffness of the compliant member (e.g., the spring constant for the spring in the embodiment illustrated in FIG. 3), the contact force between the bead breaker roller tool 116 and the wheel rim 106 may be reliably generated, as well as limited to an amount well below an amount that could damage the wheel rim 106 or any component of the machine 100. In an exemplary embodiment, about 200 pounds of contact force is generated, although greater or lesser amounts of contact force could be generated as desired.

The switches 242 and 244 may be proximity switches in one example, although a variety of other types of switches and sensors may be used with like effect in other embodiments. For example, a linear position sensor and/or a rotational position sensor, varieties of which are known in the art, could be utilized to monitor an axial displacement of the actuator 154 and/or measure an amount of deflection or displacement of the compliant element 240 in other embodiments to provide force feedback signals for the benefit of the controller 152. In lieu of the switches described providing indirect indications of contact force, force feedback sensors, a variety of which are also known in the art, could alternatively be used to directly provide feedback control signals indicative of contact force for the benefit of the controller 152.

Further, although a compression spring has been described above, a tension spring could be used with like effect as the compliant member in another embodiment. Further, other types of elastic or resilient materials could be used as the compliant member 240 in lieu of a coil spring as shown and described. It should be understood that a spring is not required at all to achieve the function and purpose of the compliant member 240 as described. The deflection of other compliant members could likewise be detected with the switches 242 and 244 to provide force feedback for control purposes. Other examples of potential compliant members include, but are not limited to, a compressible rubber material or a pneumatic cylinder. Various alternatives are possible within the scope of the invention on these points.

As shown in FIG. 4, the tool assembly may include a locking mechanism 253 that prevents (locks) or allows (unlocks) the functionality of the compliant member 240. As such, the action of the compliant member 240 and the switches as described may selectively be disabled.

In the exemplary embodiment shown, the locking mechanism 253 includes the sliding rod 246 connected to the actuator 154. The rod 246 is formed with an annular groove 256, which may be positioned through a piston 254 including a rod eye hole. The diameter of the rod eye hole may be slightly larger in size than the diameter of the rod 246. A bias element such as a spring 255 may further be provided, and normally the spring 255 applies a bias force upon the rod eye side of the piston 254 to shift the oversized rod eye hole into engagement with the annular groove 256 of the rod 246. This causes an interference which prevents axial movement of the rod 246 in the direction C and thus prevents relative movement between the tool slide 202 and the actuator 154. Hence, this constitutes a locked position in the exemplary embodiment shown. The locked position is further sometimes referred to as a "non-compliant" position as the locking mechanism 253 in this position effectively disables any action of the compliant element 240 and its functionality as described above. The compliant member 240 in the locked position is mechanically isolated from the remainder of the assembly.

When actuating fluid is applied to the piston 254, which may be coordinated by the controller 152, the rod eye is moved to a position such that it no longer interferes with the annular groove 256 and the rod 246 is free to move axially. This constitutes an unlocked position in the exemplary embodiment shown, and is sometimes referred to as a compliant position because the functionality of the compliant member is enabled. In particular, since the lower bead breaker roller 116 (FIG. 1a) is often used to demount the lower bead of the tire after the upper tire bead has been demounted, it may be desirable to disable the compliant member 240 while the lower tire bead is being demounted. The controller 152 may accordingly activate or deactivate the compliant member 240 via locking or unlocking of the mechanisms 253 for the upper and lower bead breakers as desired. It is further contemplated that in some embodiments the locking or unlocking of the mechanism 253 could be manually selected by the operator using an appropriate input selector provided on the machine.

While an exemplary locking mechanism 253 is shown in FIG. 4, it is recognized that other locking mechanisms are possible and may alternatively be utilized with similar effect. It is also contemplated that in some embodiments the locking mechanism 253 may be considered optional and may be omitted.

In the position shown in FIGS. 3 and 6a, the controller 152 operates the actuators 154 and 156 until the periphery 210 of the bead breaker roller tool 116 is adjacent to the lip 220 of the wheel rim 106. In the position shown, a top surface of the bead break roller tool 116 is also approximately level with the top of the lip 220, and the outer periphery 210 of the bead breaker roller tool 116 is slightly spaced from an edge of the lip 220. Additionally, the conical shaped surface 212 of the bead breaker roller tool 116 is engaged to the tire sidewall 216 adjacent the wheel rim lip 220. This defines an initial or start position for a tire bead breaking procedure. The initial or start position may be entirely accomplished by the controller 152 in an automated manner without human assistance, or may be achieved at least in part with some guidance by the operator to locate the wheel rim 106. In a completely automated embodiment, machine vision or other technology could be utilized to locate the wheel rim 106 and establish the initial position.

While only the upper bead breaker tool 116 is shown in FIG. 3, the lower bead breaking tool 116 (FIG. 1a) may be similarly equipped and similarly operated to break a tire bead on the lower side of the rim. If the lower bead breaking tool 116 (FIG. 1a) is to be placed in its initial or starting position by the controller 152 in an automated manner, other information may be required such as, for example, a distance between the tire sidewall 216 and the lip 220 of the wheel rim 106. Sensors and the like may be provided to communicate such information to the controller 152 if desired.

After the controller 152 places the upper bead break roller tool 116 in its starting position, the controller 152 may operate actuators 154 and 156 to move the bead break roller tool 116 upwardly to provide a clearance above the tire sidewall 216, then away from the axis of rotation 112 in the direction of arrow C, and then down to bring the roller conical surface 212 into contact with the tire sidewall 216. The controller 152 may read a sensor to determine when such contact is made and then computes a vertical distance between the starting point and the tire sidewall 216. Then the lower bead break roller tool 116 (FIG. 1a) is positioned at the same diameter where the upper bead break roller tool 116 made contact with the tire sidewall 216. Then the lower bead break roller tool 116 (FIG. 1a) is raised up until the controller 152 senses contact with the bottom tire sidewall. Finally, the controller 152 moves the lower bead break roller tool 116 (FIG. 1a) to the same starting diameter as the upper bead break roller tool 116, and positions the lower bead break roller tool 116 (FIG. 1a) at a vertical height equaling the height at which contact was made with the bottom tire sidewall less the computed distance between the tire sidewall 216 and the upper bead break roller tool 116 starting point.

The exemplary wheel rim profile shown is not symmetrical, so in such an embodiment the path taken by the lower bead breaker would not be the same as the path E taken by the upper bead breaker 116 shown in FIG. 3. Likewise, for a differently configured rim, another motion path, different from the path E as shown, would be taken by the upper bead breaker roller 116 and the path of motion of the lower bead breaker would also be different. Because the bead breaker rollers naturally follow the contoured profile of any given wheel rim, whatever that profile happens to be, a practically unlimited number of different motion paths are made possible for the bead breaker tools 116. As such, the machine 100 is self-adapting to different wheel rim configurations, without any prior knowledge or information concerning the configuration of wheel rims being provided, and without the machine 100 having to recognize a wheel rim configuration to successfully operate.

Additionally, it is understood that in another embodiment the mounting structure to which the wheel rim 106 is coupled may be movable relative to the bead breaker tools 116 to bring the wheel rim 106 into contact with the bead breaker tools 116 with a predetermined amount of contact force. The reader is referred to the discussion of the spindle actuator 170 discussed above, which may include its own compliant member 174 as also discussed above in relation to FIG. 2, on this point.

FIGS. 6a to 6d show the bead breaker roller tool 116 being moved downwardly along the path E and accordingly deflecting a portion of the tire sidewall 216. As the roller outer periphery 210 clears the wheel rim lip 220 (FIG. 6b), the roller 116 moves radially inwardly to contact the rim surface 218 with a predetermined amount of force and dislodges the tire bead 118 from the bead seat 218. When the bead breaker roller tool 116 moves radially inwardly, the force stored in the compliant member 240 (FIG. 3) increases to maintain contact between the bead breaker outer periphery 210 and the wheel rim 106. As the bead breaker roller 116 continues along the path of arrow E, which matches the profile of the wheel rim 106, the tire bead 118 is pushed toward the drop center 226 of the wheel rim. As the bead breaker approaches the wheel rim safety hump 222 (FIG. 6d) having a larger radius, contact force is again generated and stored in the compliant member 240. Using the compliant member 240, and the switches 242, 244, the contact force generated can again be monitored, limited, or adjusted as necessary to avoid excessive force buildups that could potentially damage the wheel rim 106 or a component of the machine 100.

In a further embodiment, the controller 152 (FIG. 3) may reduce the energy stored in the compliant member 240 before the bead breaker tool 116 clears the safety hump 222. For example, the bead breaker tool 116 can be moved downwardly in the direction of arrow B for a predetermined and relatively short distance, with the predetermined amount of contact force with the wheel rim as described above to initially deflect the tire sidewall 216. Before moving the bead breaker roller tool 116 further in the direction of arrow B, however, the actuator 154 (FIG. 3) may be reversed to release some or all of the force stored in the compliant member 240 when the contact force was initially generated. Such release of the stored force can be confirmed with the switches 242, 244, or by other means. As such, when the safety hump 222 is later encountered, the compliant member 240 is relatively relaxed and can absorb the contact force generated between the safety hump 222 and the bead breaker tool 116 as the tool moves along the path E. Such relaxation of the compliant member may be advisable to avoid a potentially violent mechanical shock that may otherwise occur when a relatively large amount of force is released when the bead breaker roller tool 116 clears the safety hump 222, if present.

Regardless of whether or not the compliant member 240 is relaxed or not, as the bead breaker roller tool 116 continues down the path E, the tire bead 118 is eventually deflected into the rim drop center 226 and the tire bead seal 118 may be considered to be broken. By rotating the wheel rim 106 about the drive axis 112, the entire circumference of the tire bead seal may be broken quickly and effectively. The tire bead breaking procedure is now complete.

Figure 7:
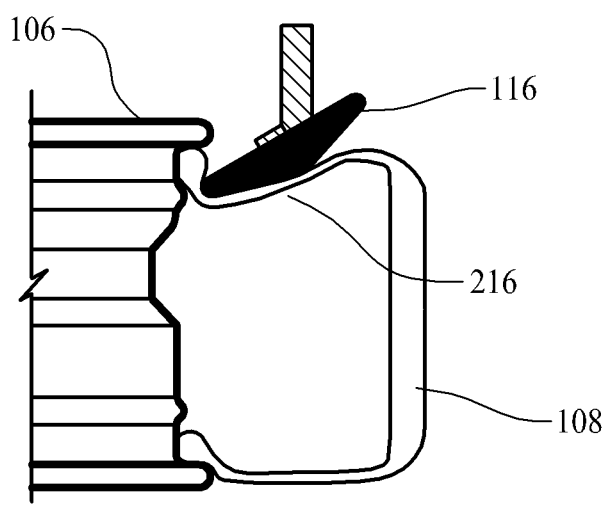
FIG. 7 illustrates a tire sidewall buckling condition that is avoided by the bead breaking positions shown in FIGS. 3 and 4.

FIG. 7 illustrates a tire sidewall buckling condition that is largely avoided, if not eliminated, with the exemplary inventive embodiments described above. The buckling condition is a problem presented by certain types of tires and rims with conventional machines, particularly those wherein the bead breaking tool 116 is physically spaced from the wheel rim lip 220 at the start of a bead breaking procedure, and when the bead breaking tool 116 is not moved far enough towards the bead seat 218 after the bead breaking tool 116 clears the wheel rim lip 220 for fear of making contact between the tool and the wheel rim. As seen in FIG. 7, the sidewall 216 of the tire 108 has buckled under the pressure of the bread breaker roller tool 116, while the tire bead 118 remains firmly seated to the bead seat 218 of the wheel rim 106. Such conditions are not uncommon when attempting to change high aspect ratio tires with conventional machines and can be frustrating to machine operators.

This buckling condition is believed to be much less likely to occur, if it occurs at all, when the above described contact and contact force is established between the bead breaker tool 116 and the wheel rim 106. The spacing between the wheel rim 106 and the bead breaker tool 116, which is believed to contribute to the buckling of the tire sidewall 216, is eliminated in the exemplary inventive embodiments disclosed. Further, in the unlikely event that such a sidewall buckling condition was to occur in the machine 100 having the control system 150 and compliant members described, the buckling tire would generate a reaction force on the bead breaking roller tool 116. The reaction force would in turn, generate a sudden increase in force on the compliant element 240 that could be detected with a switch, such as either the switch 244 or a third switch spaced from the switch 244 in one example. Once such a condition is detected, the controller 152 could take appropriate action, including but not limited to adjusting the operation of the actuators 154 and 156 in response to the buckling sidewall, suspending any rotation of the wheel rim 106 about the drive axis 112, or prompting the machine operator to take corrective action by activating an audio or visual alarm in any manner known in the art.

Figure 8:
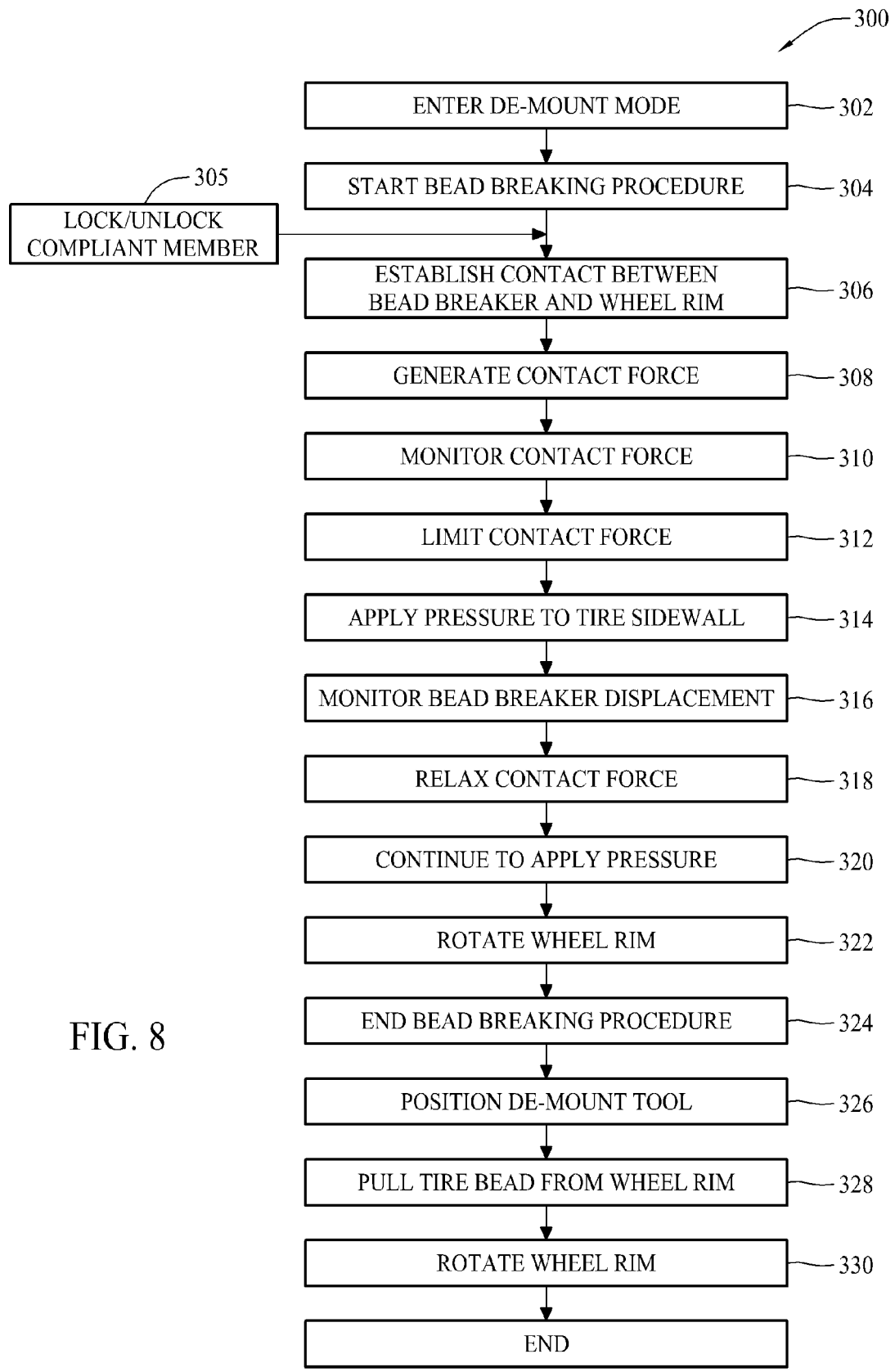
FIG. 8 is a method flowchart of an algorithm executable by the controller shown in FIGS. 2 and 3.

FIG. 8 is a method flowchart of an exemplary algorithm 300 executable by the machine 100 including the controller 152 as described above. The algorithm may be executed in whole or in part by the controller 152 to provide a completely automated tire bead breaking procedure without human assistance or input or a partly automated tire bead breaking procedure. The algorithm 300 assumes that a wheel rim and tire have been loaded on and secured to the machine for a tire change operation.

The algorithm 300 includes, as shown in FIG. 8, entering a tire demount mode at step 302 from a main control loop. In an exemplary embodiment, a machine operator may optionally select, for example, a tire mount mode or a tire de-mount mode of operation using one of the input selectors provided on the machine. On machines not including distinct tire mount and de-mount modes, the step of entering the de-mount mode as shown at step 302 may of course be omitted.

At step 304 in the algorithm, the bead breaking procedure is commenced. At step 305, the controller may lock or unlock the compliant members in the respective tool assemblies as explained above. It is understood that the locking of the compliant member will render certain steps of the algorithm as explained inapplicable for the corresponding tool assembly. For explanatory purposes, the following description, however, assumes that the compliant members are unlocked for full functionality thereof.

As shown at step 306, the controller 152 may operate the actuators 154 to adjust a position of a bead breaker tool assembly (FIGS. 3-5) relative to the wheel rim 106 (or vice versa) and establish surface contact between the bead breaker tool 116 and the wheel rim 106. Alternatively, a machine operator may position the bead breaker tool 116 relative to the wheel rim 106 (or vice versa) to establish, or very nearly establish, an initial contact between the two. The initial contact may be confirmed and communicated to the controller 152 by any of the techniques described above or otherwise known in the art.

At step 308, an initial contact force is generated by operating one of the actuators (e.g., the actuator 154 in FIGS. 2-5) after contact between the bead breaker tool 116 and the wheel rim 106 is made. The contact force is monitored at step 310 and limited at step 312 once a threshold contact force has been obtained. The limiting of the contact force at step 312 may correspond to deactivating the actuator 154 as described above in response to the switches 242, 244 as described above, although other acts or elements may be associated with such a step in an alternative embodiment. As described above, once the actuator 154 has been deactivated, the compliant member 240, which is charged by the generation of the contact force, maintains the contact force after the actuator 154 ceases to be operated.

At step 314, the bead breaker tool 116 is moved downward against the tire sidewall in the direction of arrow B (FIGS. 3 and 6) to apply pressure to the tire sidewall. As the bead breaker tool 116 is moved in this direction, the tire sidewall begins to deflect.

At step 316, the controller 152 optionally monitors the displacement of the bead breaker tool 116 as the downwardly directed pressure is applied to the tire sidewall. Also optionally, at step 318 the contact force is relaxed when the bead breaker tool 116 has been displaced by a threshold amount. The threshold amount in contemplated embodiments is rather small, and specifically is about ¼ inch in one example. Such a small amount is sufficient enough to cause some deflection of the tire sidewall so that the bead breaker roller 116 can be driven between it and the wheel rim lip 220 (FIG. 3), but not sufficient to break the tire bead seal completely loose. In such a position, the tire 108 still provides some resistance to the stored force in the compliant member 240, which prevents an unconstrained or uncontrolled release of force when the bead breaker tool 116 clears the safety hump 222.

As previously mentioned, relaxation of the compliant member 240 may be desirable in the event that the wheel rim includes a safety hump 222 that may otherwise result in a significant buildup of contact force beyond that initially provided and maintained by the compliant member 240 as the bead breaker tool 116 clears the safety hump 222. By relaxing the compliant member first, the compliant member 240 can be recharged with force, but to a much lesser extent, as the safety hump is navigated and mitigate sudden and uncontrolled releases of force when the largest diameter portion of the safety hump 222 is cleared.

At step 320, the bead breaker device 116 is operated to continue applying force and pressure to the tire sidewall. As the bead breaker device 116 continues down its path of motion following the wheel rim profile, the tire bead 118 is eventually pushed into the drop center 226 of the wheel rim 106. The wheel rim 106 may be rotated as shown at step 322 to release the entire inner circumference of the tire bead 118 from the wheel rim 106. The bead breaking procedure then ends at step 324.

The bead breaking procedure including steps 304-326 may be repeated on the other side of the wheel rim 106 using the lower bead breaker roller tool 116.

At step 326, the de-mount tool 114 may be positioned to grab the tire bead from the wheel rim drop center 226 and pull the tire bead over the wheel rim lip 220 for removal at step 328. The wheel rim may be rotated at step 330 to pull the entire inner circumference of the tire 108 from the wheel rim. The tire 108 may then be lifted from the machine 100 while the wheel rim 106 remains in place.

A replacement tire may then be obtained and mounted to the wheel rim 106, using the bead breaker rollers 116 to push the tire bead back into the drop center 126 of the wheel rim 106.

It is believed that those in the art may program the controller or otherwise configure it to implement the algorithm 300 without further explanation. It is recognized that not all of the steps as shown and described are necessary to accomplish at least some of the benefits described. It is further recognized that the sequence of the steps as described are not necessarily limited to the particular order set forth, and that some of the functionality described can be achieved with other sequences of steps. Additional steps beyond those specifically described may be implemented in combination with the steps described. The exemplary algorithm 300 is therefore offered for purposes of illustration rather than limitation.

The benefits and advantages of the invention are now believed to be amply illustrated by the foregoing exemplary embodiments.

An embodiment of a tire changer machine for changing a tire on a wheel rim has been disclosed. The machine includes: a base; a drive assembly coupled to the base and configured to rotate a wheel rim and associated tire about a rotational axis; a tool support frame extending in spaced relation to the drive assembly; a bead breaker device coupled to the tool support frame; and a controller adjusting a position of one of the bead breaker device and the wheel rim to establish contact between the wheel rim and the bead breaker device while a tire bead breaking procedure is executed.

Optionally, the controller is operable to generate a predetermined amount of contact force between the wheel rim and the bead breaker device. The wheel rim may include a non-linear surface profile in a plane extending parallel to the rotational axis, and at least one of the bead breaker device and the wheel rim may be movable relative to the other of the bead breaker device and the wheel rim, whereby the bead breaker device is maintained in surface contact with the non-linear surface profile of the wheel rim as the tire bead breaking procedure is executed. The bead breaker device may include at least one actuator responsive to the controller to adjust the position of the bead breaker device relative to the wheel rim and establish surface contact between the bead breaker device and the wheel rim.

The bead breaker device may further include a compliant member associated with the at least one actuator, the compliant member configured to maintain at least a predetermined amount of contact force between the bead breaker tool and the wheel rim during the tire bead breaking procedure. The compliant member may be selectively enabled or disabled. The compliant member may be mechanically isolated from the actuator when disabled.

The bead breaker device may also include at least one force sensing element detecting an amount of contact force generated between the bead breaker device and the wheel rim, wherein the controller is responsive to the at least one force element to limit an initial amount of contact force. The force sensing element comprises a compliant element and at least one sensor element associated with the compliant element. The sensor element may be a switch. The sensor element may also be one of a linear position sensor and a rotational position sensor configured to measure a displacement of the compliant element The bead breaker device may also include a bead breaker roller tool, and at least one actuator coupled to the bead breaker roller tool and operable to move the bead breaker roller along at least one axis until said surface contact is established. A compliant member may be configured to maintain the bead breaker roller tool in surface contact with the wheel rim along the first axis. The wheel rim surface may include a non-linear profile having a variable diameter relative to the rotational axis of the drive assembly, and the compliant member may maintain the bead breaker roller tool in surface contact with the non-linear profile as the tire bead is broken. A second actuator may also be coupled to the bead breaker tool, with the second actuator moving the bead breaker tool along a second axis substantially perpendicular to the first axis.

An exemplary method of executing a tire bead breaking procedure on a wheel rim has also been disclosed. The method utilizes a machine including a drive assembly configured to rotate the wheel rim about a rotational axis, a bead breaker device and a controller for positioning one of the wheel rim and the bead breaker device, and the method includes: establishing contact between the wheel rim and the bead breaker device; and maintaining, for at least a portion of the tire bead breaking procedure, contact between the wheel rim and the bead breaker device to break a tire bead seal between a tire and the wheel rim.

Optionally, the method may further include maintaining, for the entire tire bead breaking procedure, contact between the wheel rim and the bead breaker device to break a tire bead seal between a tire and the wheel rim The method may include rotating the wheel rim while maintaining the contact. The machine may include at least one actuator and a compliant member associated with the bead breaker device, with the method further including: generating an initial contact force between the bead breaker device and the wheel rim using the actuator; and the compliant member maintaining at least a minimum contact force between the wheel and the bead breaker.

The method may also include holding the actuator in a fixed position after a predetermined amount of contact force is generated. The machine may have a sensor associated with the compliant member, with the method further comprising holding the actuator in a fixed position in response to the sensor. A force detecting element may communicate with the controller, and the method may further include: monitoring, via the force detecting element, an amount of contact force established between the bead breaker device and the wheel rim.

The bead breaker device may be a bead breaker roller tool and the wheel rim may have a non-linear profile having a variable diameter relative to the rotational axis of the drive assembly, with the method further comprising: maintaining surface contact between the bead breaker roller tool and at least one varying diameter portion of the non-linear profile to execute the tire bead breaking procedure.

Establishing contact between the wheel rim and the bead breaker device may include the controller establishing the contact force in an automated manner.

When the machine further includes at least one actuator, a compliant member associated with the bead breaker device, and a locking element associated with the compliant member, the method may further include locking or unlocking the compliant member to disable or enable functionality of the compliant member.

An embodiment of a tire changer machine for changing a tire on a wheel rim has likewise been disclosed. The machine includes: a base; a drive assembly coupled to the base and configured to rotate a wheel rim and associated tire about a rotational axis; a tool support frame extending in spaced relation to the drive assembly; a bead breaker device coupled to the tool support frame; an actuator associated with the bead breaker device; and a compliant member associated with the at least one actuator, the compliant member configured to maintain at least a predetermined amount of contact force between the bead breaker tool and the wheel rim during the tire bead breaking procedure.

Optionally, the machine may further include a controller adjusting a position of one of the bead breaker device and the wheel rim to establish contact between the wheel rim and the bead breaker device while a tire bead breaking procedure is executed. The actuator may be operable to move bead breaker toward and away from the wheel rim. The controller may be configured to generate the predetermined amount of contact force. A sensor may monitor a state of the compliant member. The sensor may generate a feedback signal indicative of the contact force. The sensor may be a switch. The compliant member may include a helical spring, and the helical spring may be compressed as the contact force is applied. A locking mechanism may be provide, and the locking mechanism may be positionable to mechanically isolate the compliant member.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A tire changer machine for changing a tire on a wheel rim, the machine comprising:
    a base;
    a drive assembly coupled to the base and configured to receive and rotate a wheel rim and associated tire about a rotational axis;
    a tool support frame extending in spaced relation to the drive assembly; a bead breaker device coupled to the tool support frame; and
    a controller adjusting a position of one of the bead breaker device and the wheel rim to establish contact between the wheel rim and the bead breaker device while a tire bead breaking procedure is executed with the wheel rim secured to said drive assembly.

2. The tire changer machine of claim 1, wherein the controller is operable to generate a predetermined amount of contact force between the wheel rim and the bead breaker device.

3. The tire changer machine of claim 1, wherein the wheel rim includes a non-linear surface profile extending parallel to the rotational axis, and at least one of the bead breaker device and the wheel rim is movable relative to the other of the bead breaker device and the wheel rim, whereby the bead breaker device is maintained in surface contact with the non-linear surface profile of the wheel rim as the tire bead breaking procedure is executed.

4. The tire changer machine of claim 1, wherein the bead breaker device includes at least one actuator responsive to the controller to adjust the position of the bead breaker device relative to the wheel rim and establish surface contact between the bead breaker device and the wheel rim.

5. The tire changer machine of claim 4, wherein the bead breaker device further comprises a compliant member associated with the at least one actuator, the compliant member configured to maintain at least a predetermined amount of contact force between the bead breaker tool and the wheel rim during the tire bead breaking procedure.

6. The tire changer machine of claim 5, wherein the compliant member may be selectively enabled or disabled.

7. The tire changer machine of claim 6, wherein the compliant member is mechanically isolated from the actuator when disabled.

8. The tire changer machine of claim 1, wherein the bead breaker device further includes at least one force sensing element detecting an amount of contact force generated between the bead breaker device and the wheel rim, wherein the controller is responsive to the at least one force sensing element to limit an initial amount of contact force.

9. The tire changer machine of claim 8, wherein the force sensing element comprises a compliant element and at least one sensor element associated with the compliant element.

10. The tire changer machine of claim 9, wherein the at least one sensor element comprises a switch.

11. The tire changer machine of claim 9, wherein the at least one sensor element comprises one of a linear position sensor and a rotational position sensor configured to measure a displacement of the compliant element.

12. The tire changer machine of claim 1, wherein the bead breaker device comprises a bead breaker roller tool.

13. The tire changer machine of claim 12, wherein the bead breaker device further includes at least one actuator coupled to the bead breaker roller tool and operable to move the bead breaker roller tool along at least one axis until said surface contact is established.

14. The tire changer machine of claim 13, wherein the bead breaker device further includes a compliant member configured to maintain the bead breaker roller tool in surface contact with the wheel rim along the at least one axis.

15. The tire changer machine of claim 14, wherein the wheel rim surface includes a non-linear profile having a variable diameter relative to the rotational axis of the drive assembly, and the compliant member maintains the bead breaker roller tool in surface contact with the non-linear profile as the tire bead is broken.

16. The tire changer machine of claim 13, wherein at least one actuator includes a first acuator and a second actuator coupled to the bead breaker tool, the second actuator moving the bead breaker tool along a second axis substantially perpendicular to the at least one axis.

17. A method of executing a tire bead breaking procedure on a wheel rim, the method utilizing a machine including a drive assembly configured for mounting the wheel rim for rotation about a rotational axis, a bead breaker device and a controller for positioning one of the wheel rim and the bead breaker device, the method comprising:
    establishing contact between the wheel rim and the bead breaker device while the wheel rim is mounted to the drive assembly; and maintaining, for at least a portion of the tire bead breaking procedure, contact between the wheel rim and the bead breaker device to break a tire bead seal between a tire and the wheel rim.

18. The method of claim 17, further comprising maintaining, for the entire tire bead breaking procedure, contact between the wheel rim and the bead breaker device to break a tire bead seal between a tire and the wheel rim.

19. The method of claim 17, further comprising rotating the wheel rim about said rotational axis while maintaining the contact.

20. The method of claim 17, wherein the machine further includes at least one actuator and a compliant member associated with the bead breaker device, the method further comprising:
   generating an initial contact force between the bead breaker device and the wheel rim using the actuator; and
   the compliant member maintaining at least a minimum contact force between the wheel and the bead breaker.

21. The method of claim 20, further comprising holding the actuator in a fixed position after a predetermined amount of contact force is generated.

22. The method of claim 20, the machine including a sensor associated with the compliant member, the method further comprising holding the actuator in a fixed position in response to the sensor.

23. The method of claim 17, the machine further including a force detecting element communicating with the controller, the method further comprising:
   monitoring, via the force detecting element, an amount of contact force established between the bead breaker device and the wheel rim.

24. The method of claim 17, wherein the bead breaker device is a bead breaker roller tool and the wheel rim has a non-linear profile having a variable diameter relative to the rotational axis of the drive assembly, the method further comprising:
   maintaining surface contact between the bead breaker roller tool and at least one varying diameter portion of the non-linear profile to execute the tire bead breaking procedure.

25. The method of claim 17, wherein establishing contact between the wheel rim and the bead breaker device comprises the controller establishing the contact force in an automated manner.

26. The method of claim 17, wherein the machine further includes at least one actuator, a compliant member associated with the bead breaker device, and a locking element associated with the compliant member, the method further comprising:
   locking or unlocking the compliant member to disable or enable functionality of the compliant member.

27. A tire changer machine for changing a tire on a wheel rim, the machine comprising:
   a base;
   a drive assembly coupled to the base, said drive assembly configured to receive a wheel rim for rotation of said wheel rim and associated tire about a rotational axis;
   a tool support frame extending in spaced relation to the drive assembly;
   a bead breaker device coupled to the tool support frame to operatively engage a wheel rim secured to said drive assembly;
   an actuator associated with the bead breaker device; and
   a compliant member associated with the at least one actuator, the compliant member configured to maintain at least a predetermined amount of contact force between the bead breaker tool and the wheel rim during a tire bead breaking procedure for a wheel rim secured to said drive assembly.

28. The tire changer machine of claim 27, further comprising a controller adjusting a position of one of the bead breaker device and the wheel rim to establish contact between the wheel rim and the bead breaker device while a tire bead breaking procedure is executed.

29. The tire changer machine of claim 28, wherein the controller is configured to generate the predetermined amount of contact force.

30. The tire changer machine of claim 28, further comprising a sensor monitoring a state of the compliant member.

31. The tire changer machine of claim 30, wherein the sensor generates a feedback signal indicative of the contact force.

32. The tire changer machine of claim 31, wherein the sensor comprises a switch.

33. The tire changer machine of claim 27, wherein the actuator is operable to move bead breaker toward and away from the wheel rim.

34. The tire changer machine of claim 27, wherein the compliant member comprises a helical spring.

35. The tire changer machine of claim 34, wherein the helical spring is compressed as the contact force is applied.

36. The tire changer machine of claim 34 further comprising a locking mechanism, the locking mechanism being positionable to mechanically isolate the compliant member.

* * * * *